United States Patent
Mattes

(10) Patent No.: US 6,644,126 B2
(45) Date of Patent: Nov. 11, 2003

(54) SENSOR DEVICE FOR DETECTING MECHANICAL DEFORMATION

(75) Inventor: Bernhard Mattes, Sachsenheim (DE)

(73) Assignee: Robert Bosch GmbH, Stuttgart (DE)

(*) Notice: Subject to any disclaimer, the term of this patent is extended or adjusted under 35 U.S.C. 154(b) by 0 days.

(21) Appl. No.: 10/146,164

(22) Filed: May 15, 2002

(65) Prior Publication Data

US 2002/0174708 A1 Nov. 28, 2002

(30) Foreign Application Priority Data

May 15, 2001 (DE) .......................... 101 23 627

(51) Int. Cl.⁷ ................................. G01N 3/00
(52) U.S. Cl. ............................. 73/760; 73/763
(58) Field of Search .................. 73/760, 763, 774, 73/12.01

(56) References Cited

U.S. PATENT DOCUMENTS

| | | | | |
|---|---|---|---|---|
| 4,426,884 A | * | 1/1984 | Polchaninoff | 73/172 |
| 4,503,705 A | * | 3/1985 | Polchaninoff | 73/172 |
| 5,086,785 A | * | 2/1992 | Gentile et al. | 600/595 |
| 5,189,777 A | * | 3/1993 | Guckel et al. | 29/424 |
| 5,316,619 A | * | 5/1994 | Mastrangelo | 73/715 |
| 5,357,808 A | * | 10/1994 | Fung et al. | 73/721 |
| 5,510,276 A | * | 4/1996 | Diem et al. | 438/53 |
| 6,212,314 B1 | * | 4/2001 | Ford | 385/30 |
| 6,431,005 B1 | * | 8/2002 | Delaye | 73/724 |
| 6,460,234 B1 | * | 10/2002 | Gianchandani | 29/25.35 |
| 6,470,754 B1 | * | 10/2002 | Gianchandani | 73/718 |

* cited by examiner

Primary Examiner—Edward Lefkowitz
Assistant Examiner—Andre Allen
(74) Attorney, Agent, or Firm—Kenyon & Kenyon

(57) ABSTRACT

A sensor device for detecting mechanical deformation of a component, in particular in the automotive field, has a deformation device, which has a deformable polysilicon part that undergoes a change in electric resistance in deformation; and an electric line arrangement for analog transmission of the change in resistance data of the polysilicon part from the deformation device to a central unit.

10 Claims, 2 Drawing Sheets

SENSOR DEVICE FOR DETECTING MECHANICAL DEFORMATION

FIELD OF THE INVENTION

The present invention relates to a sensor device for detecting mechanical deformation of a component.

BACKGROUND INFORMATION

Although applicable to any components, the present invention and the principles on which it is based are explained with respect to a component in the automotive area.

In general, for protection of occupants in automotive engineering, it is necessary to promptly detect an impact or collision of the motor vehicle with an obstacle and to activate proper passenger safety applications. Deformation sensor devices are frequently also used in addition to acceleration sensor devices.

According to the related art, the deformation sensor devices that are used are based on metal-layer strain gauges. Metal-layer strain gauges are riveted to a door-reinforcing element of the vehicle, for example, and function as extra detectors in addition to the peripheral side impact-detecting acceleration sensors for detecting deformation of the door as a result of impact of same with an obstacle; shorter deployment times are to be made possible for the corresponding safety applications.

Typical metal-layer strain gauges are made of constantan or nickel-chromium layers, for example. Mechanical deformation of the metal-layer strain gauge causes its electric resistance to change. The quotient of the percentage change in resistance and percentage change in length is known as the k factor and amounts to approximately 2 for the examples given above. Metal-layer strain gauges are usually dimensioned so as to yield a scaling factor of 2 mV/V in a complete measurement range. However, this is only a low useful signal.

The problem on which the present invention is based is thus in general that because of the low useful signal, on-site pre-amplification and a suitable digital interface are necessary for transmission of the corresponding change in resistance data to a central unit.

SUMMARY OF THE INVENTION

The sensor device according to the present invention has the advantage in comparison with the known approach that a cost-optimized deformation sensor device for side impact detection, for example, is feasible, supplying a sufficiently large signal for the change in resistance due to mechanical deformation, this signal being transmittable as an analog signal to a central unit for analysis.

The idea on which the present invention is based is that the sensor device has a deformation device, which has a deformable polysilicon part that undergoes a change in electric resistance when deformed, and it has an electric conductor arrangement for analog transmission of change in resistance data concerning the polysilicon part from the deformation device to a central unit.

In the event of deformation of the polysilicon part, a useful signal is obtained on the basis of the change in resistance, which is large enough for analog transmission to a central unit even without pre-amplification. This makes it possible to eliminate expensive additional electronic components and to manufacture a more compact and cost-optimized sensor device.

According to a preferred refinement, the polysilicon part is designed as a polysilicon strain gauge (DMS). It is often sufficient to detect deformation along a certain segment.

According to another preferred refinement, the polysilicon strain gauge has a k factor of up to 40. This yields such a large change in resistance that the useful signal is transmittable as an analog signal to a central unit without preamplification.

According to another preferred refinement, due to suitable doping of the polysilicon strain gauge, it has a k factor which is essentially independent of the temperature of the polysilicon strain gauge. Due to this lack of thermal sensitivity of the k factor, a greater reliability of the measured values is achieved.

According to another preferred refinement, the deformation device has a carrier on which there is a Kapton (polyimide) film or the like on which in turn the polysilicon strain gauge is glued and into which the corresponding electric lines or line contacts may be integrated. This is an especially inexpensive design which is simple to manufacture.

According to another preferred refinement, contact points or bond pads for contacting the corresponding electric connections are situated on the Kapton film.

According to another preferred refinement, the deformation device has a gelatinous cover which provides both mechanical and electrical protection.

According to another preferred refinement, the deformation device is situated horizontally in a door-reinforcing element of a vehicle. For a one-dimensional deformation measurement of the door-reinforcing element, for example, it is sufficient to measure the mechanical deformation along a certain line.

According to another preferred refinement, the polysilicon strain gauge is wired as a rheostat.

According to another preferred refinement, the change in resistance data is transmittable over two twisted conductors to the central unit. The twisted conductors prevent electromechanical interference from being injected.

According to another preferred refinement, the sensor device has at least one filter device for high-pass filtering of predetermined interference quantities in particular.

Since the analysis of crash signals is performed purely dynamically in the event of a collision with an obstacle, other types of high-frequency dynamic interference must also be minimized, since they may under some circumstances cause a faulty analysis of the measurement.

DETAILED DESCRIPTION

The same reference numbers in the figures denote the same components or components having the same function.

Figure 1:
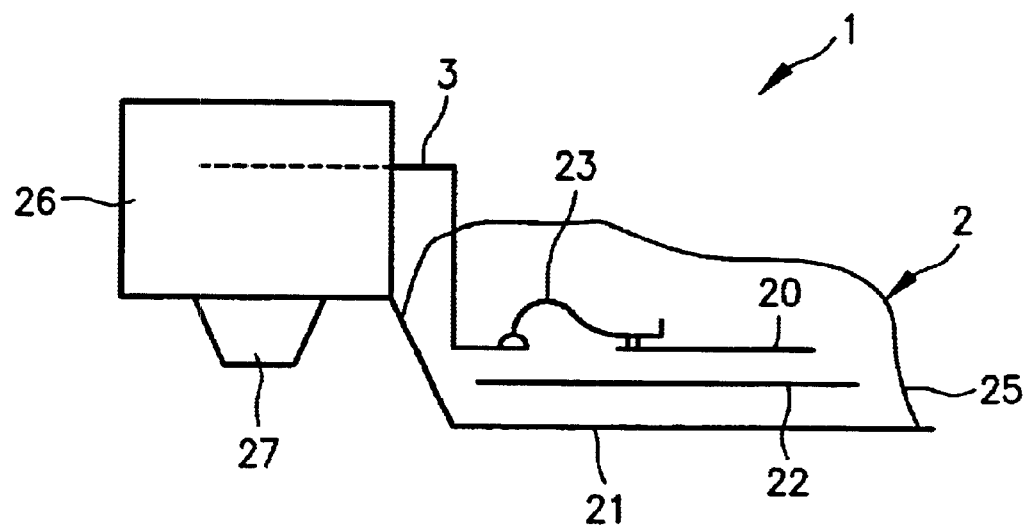
FIG. 1 shows a cross-sectional side view of a sensor device according to one embodiment of the present invention.
Figure 2:
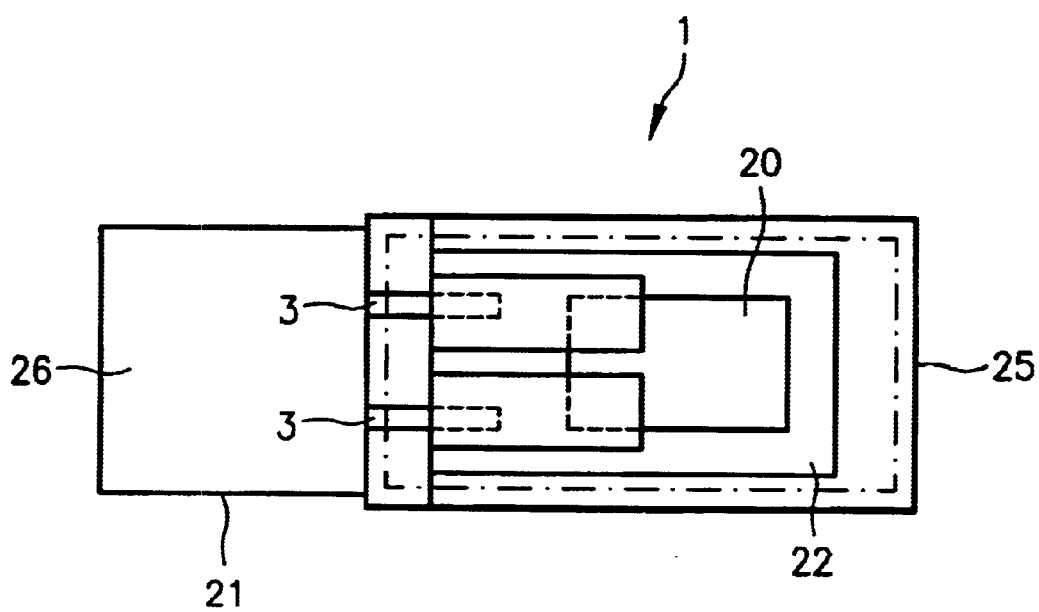
FIG. 2 shows a top view of the sensor device in FIG. 1.

FIGS. 1 and 2 show a cross-sectional side view and a top view, respectively, of a sensor device 1 according to one embodiment of the present invention.

Sensor device 1 has a substrate in the form of a bottom plate 21, which in the present embodiment is composed of two planar partial sections that are displaced axially with respect to one another and are joined by a web. One section includes a deformation device 2 and the other section according to the present embodiment has a bipolar connector 26 which engages in a recess in bottom plate 21 by a latching mechanism 27.

A copper-laminated Kapton film 22 on one side is glued onto the planar section of bottom plate 21 having deformation device 2, for example, with the topology advantageously integrated on the surface by etching.

Laminated Kapton film 22 functions as an insulation layer between polysilicon strain gauge 20 and bottom plate 21 and also functions as a substrate for the circuitry topology. Contacting pads for contacting two connector lugs 3 via bonds 23 are provided directly on polysilicon strain gauge 20.

A polysilicon strain gauge (DMS) 20 is in turn glued onto Kapton film 22.

Polysilicon strain gauge 20 undergoes approximately a percentage change in resistance of up to 40% with a percentage change in length of 1%. This yields a k factor of up to 40, describing the quotient of the percentage change in resistance and the percentage change in length in the case of mechanical deformation.

By applying a d.c. voltage to polysilicon strain gauge 20, the change in resistance data of polysilicon strain gauge 20 may be transmitted to a central unit (not shown) which is connected to connector 26 by way of bonds 23 and contacting lugs 3 of bipolar connector 26 connected to it, and the data analyzed there.

For mechanical as well as electrical protection or as a safety device, this part of sensor device 1 is covered with a gelatinous cover 25.

Figure 3:
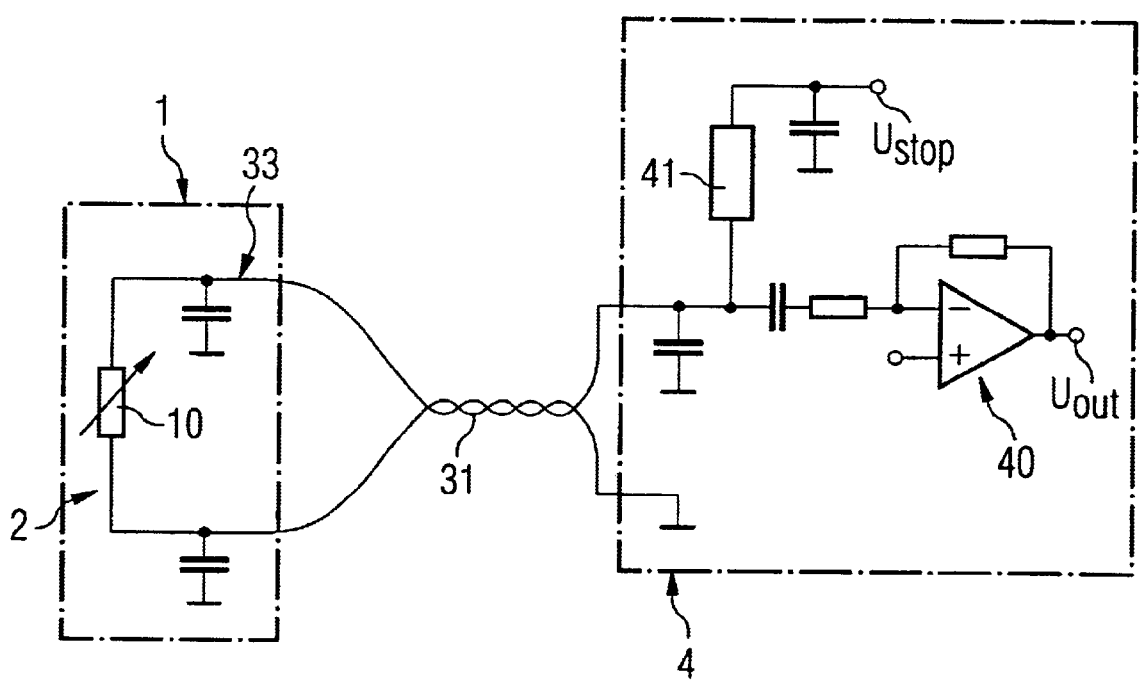
FIG. 3 shows an electric schematic diagram of the wiring of the sensor device in FIGS. 1 and 2 with a central unit.

FIG. 3 shows a circuit diagram of a wiring of sensor device 1 having central unit 4 according to one embodiment of the present invention.

To permit an approximately constant k factor, which is essentially independent of temperature fluctuations and aging of polysilicon strain gauge 20, the polysilicon is doped with suitable doping materials. Therefore, the temperature dependence of the polysilicon strain gauge sensitivity and its aging may be kept within tolerable limits.

Deformation device 2 is advantageously mounted using bottom plate 21 on the component to be measured, e.g., horizontally on a door-reinforcing element of a vehicle. A one-dimensional deformation measurement, in which a deformation of the component is measured along a predetermined line, is often sufficient. In addition, on the basis of the analyzed change in resistance data, it is possible to determine the extent to which there has been compression or expansion of polysilicon strain gauge 20, i.e., what type of deformation is involved in the case of the corresponding component.

Sensor device 1 in the electric circuit diagram according to FIG. 3 has polysilicon strain gauge resistor 10, which is advantageously wired as a rheostat and whose output signal, e.g., 30 beats per meter, is transmitted as an analog signal to a central unit via two twisted conductors 31. This eliminates the need for any additional electronic devices in external sensor device 1 for pre-amplification and digital conversion, because sufficiently large useful signals are available even without such devices due to the high k factor of 40.

The effect of two twisted conductors 31 is to essentially prevent or shield electromagnetic interference input caused by induced voltages.

Central unit 4 has a voltage source $U_{Stab}$ for a stabilized voltage supply to polysilicon strain gauge 20. The other terminal of polysilicon strain gauge 20 is connected to the vehicle ground. Power supply voltage $U_{Stab}$ is protected by a series resistor 41 which advantageously has the same resistance value as the nominal resistance of a polysilicon strain gauge for optimization of the output signal.

Furthermore, central unit 4 has an amplifier device 40 which amplifies the useful analog signal of polysilicon strain gauge 20 and subjects it to high-pass filtering. Output voltage $U_{OUT}$ thus obtained is converted by an A/D converter (not shown) into a digital useful signal. This useful signal is then sent to a controller device having a corresponding algorithm which then activates a corresponding passenger safety application if necessary.

The EMC capacitors illustrated additionally in the circuit according to FIG. 3 provide a short-circuit of interfering high-frequency signals caused by lines or antennas, for example.

On the basis of the purely dynamic analysis of crash signals, the analysis process is independent of a slow drift of the resistance value of polysilicon strain gauge resistor 10 (offset value of resistor 10) due to temperature or aging. However, high-frequency interference signals may falsify the measurement results and in the worst case may even cause unwanted deployment of a corresponding safety application. Therefore, the high-frequency filtering described above is advantageous for an improvement in the measurement results.

According to the present embodiment, central unit 4 also has a software high-pass filter device which uses a software filter to filter out of the actual useful signal any signals having a predetermined interference variation which is not typical of an impact, in order to prevent faulty deployment of passenger safety applications. This further increases the reliability of the system.

The wiring of the sensor device is explained in greater detail below on the basis of one numerical example.

Power supply voltage $U_{Stab}$ is 5 V, for example. Because of the voltage division of resistor 10 of polysilicon strain gauge 20 and series resistor 41 of central unit 4, the two of which have the same low resistance value of 250 ohm, for example, according to the present numerical example, a reference voltage $U_{REF}$ of 2.5 V is obtained at resistor 10 of polysilicon strain gauge 20. Since the k factor of polysilicon strain gauge 20 has a value of approximately 40, optimally a percentage change in length of 1% yields a change in voltage of approximately 0.4 volt at resistor 10. Reference voltage $U_{REF}$ is selected here so that the applied voltage is always in the positive range, i.e., around $U_{Stab}/2$ in both compression and elongation of strain gauge 20. This permits a more advantageous electronics design, which is also simpler to implement from a technical standpoint.

Thus, the present invention provides a sensor device with which a sufficiently large useful signal is generated in the case of mechanical deformation without an upstream preamplifier, and thus may be transmitted as an analog signal to a central unit. This eliminates the need for expensive electronics in the external deformation sensor and on the whole provides a deformation sensor device that is cost-effective and may be implemented more easily from a technical standpoint. In addition, useful signals may be separated from interference signals through an appropriate circuit, and the reliability of such a system may be increased.

Although the present invention has been described above on the basis of a preferred embodiment, it is not limited to this embodiment but instead it may be modified in a variety of ways.

For example, the series resistor for voltage division may be provided in sensor device 1 instead of being in central unit 4. The bond pads may be provided either on the Kapton film or directly on the polysilicon strain gauge.

Furthermore, the capacitors for filtering measures are only optional and are not absolutely necessary.

What is claimed is:

1. A sensor device for detecting a mechanical deformation of a component, comprising:

a central unit;

a deformation device including a deformable polysilicon part which undergoes a change in electric resistance in response to a deformation; and an electric conductor arrangement for analog transmission of change-in-resistance data of the polysilicon part from the deformation device to the central unit;

wherein the polysilicon part is a polysilicon strain gauge that is wired as a rheostat.

2. The sensor device according to claim 1, wherein the sensor device is situated in an automobile.

3. The sensor device according to claim 1, wherein the polysilicon strain gauge has a k factor of about 40.

4. The sensor device according to claim 1, wherein the polysilicon strain gauge has a k factor which is substantially independent of a temperature of the polysilicon strain gauge, due to suitable doping.

5. The sensor device according to claim 1, wherein the deformation device includes a substrate on which a Kapton film is situated, to which the polysilicon strain gauge is in turn glued and into which a corresponding topology is integratable.

6. The sensor device according to claim 5, further comprising at least one of contact points and bond pads, for production of corresponding electric connection, and further comprising lugs, the at least one of the contact points and bond pads being situated on the Kapton film and on the connector lugs.

7. The sensor device according to claim 1, wherein the deformation device includes a gelatinous cover.

8. The sensor device according to claim 1, wherein the deformation device is situated horizontally in a door-reinforcing element of a motor vehicle.

9. The sensor device according to claim 1, further comprising two twisted conductors for transmitting a change-in-resistance data to the central unit.

10. The sensor device according to claim 1, further comprising at least one filter device for high-pass filtering of predetermined interference signals.

* * * * *